US007003290B1

(12) United States Patent
Salonaho et al.

(10) Patent No.: US 7,003,290 B1
(45) Date of Patent: Feb. 21, 2006

(54) MEASUREMENT REPORTING IN A TELECOMMUNICATION SYSTEM

(75) Inventors: Oscar Salonaho, Helsinki (FI); Kari Sipila, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/622,468

(22) PCT Filed: Feb. 9, 1999

(86) PCT No.: PCT/FI99/00096

§ 371 (c)(1),
(2), (4) Date: Mar. 19, 2001

(87) PCT Pub. No.: WO99/43178

PCT Pub. Date: Aug. 26, 1999

(30) Foreign Application Priority Data

Feb. 17, 1998 (FI) .................................... 980357

(51) Int. Cl.
*H04Q 7/20* (2006.01)
(52) U.S. Cl. .................. 455/423; 455/437; 370/331
(58) Field of Classification Search ............. 455/436, 455/437, 442, 67.11; 370/331, 332, 342
See application file for complete search history.

(56) References Cited

U.S. PATENT DOCUMENTS

| 5,267,261 | A | | 11/1993 | Blakeney, II et al. ............ 375/1 |
| 5,594,949 | A | | 1/1997 | Andersson et al. ............ 455/62 |
| 5,634,192 | A | * | 5/1997 | Meche et al. ................ 455/437 |
| 5,970,407 | A | * | 10/1999 | Brunner et al. ............. 455/437 |
| 6,009,328 | A | * | 12/1999 | Muszynski ................... 455/442 |
| 6,035,197 | A | * | 3/2000 | Haberman et al. ........... 455/439 |
| 6,252,861 | B1 | * | 6/2001 | Bernstein et al. ............ 455/437 |
| 6,442,150 | B1 | * | 8/2002 | Kondo et al. ................ 455/442 |

FOREIGN PATENT DOCUMENTS

| WO | WO 95/04419 | 2/1995 |
| WO | WO-9504419 A1 | 2/1995 |
| WO | WO 98/57512 | 12/1998 |
| WO | WO-9857512 A1 | 12/1998 |

* cited by examiner

*Primary Examiner*—Lester G. Kincaid
*Assistant Examiner*—Sam Bhattacharya
(74) *Attorney, Agent, or Firm*—Harrington & Smith, LLP (57) ABSTRACT

The invention specifies at least two different triggers for sending a measurement report from the mobile station to the network. According to the invention, the network specifies the triggers to be used in different measurement report types. The triggers are preferably upper or lower threshold values for parameters of the radio signal. In response to having detected that the measured value has exceeded its upper threshold value or has gone under its lower threshold, the mobile station sends the network a measurement report.

37 Claims, 9 Drawing Sheets

MEASUREMENT REPORTING IN A TELECOMMUNICATION SYSTEM

FIELD OF THE INVENTION

This invention concerns reporting of measurements on radio interface in a telecommunication system.

BACKGROUND OF THE INVENTION

In mobile telecommunication systems mobile stations MS can use the services provided by the network using radio connections. The radio connection uses the channels of called radio interface between the mobile station and a base station of the mobile telecommunication network. Only a limited bandwidth on the radio spectrum is allocated to be used by the telecommunication systems. To gain capacity enough, the channels must be used again as densely as possible. To achieve this, the coverage area of the system is divided into cells, each being served by one base station. Due to this, the mobile telecommunication systems are often also called cellular systems.

Figure 1:
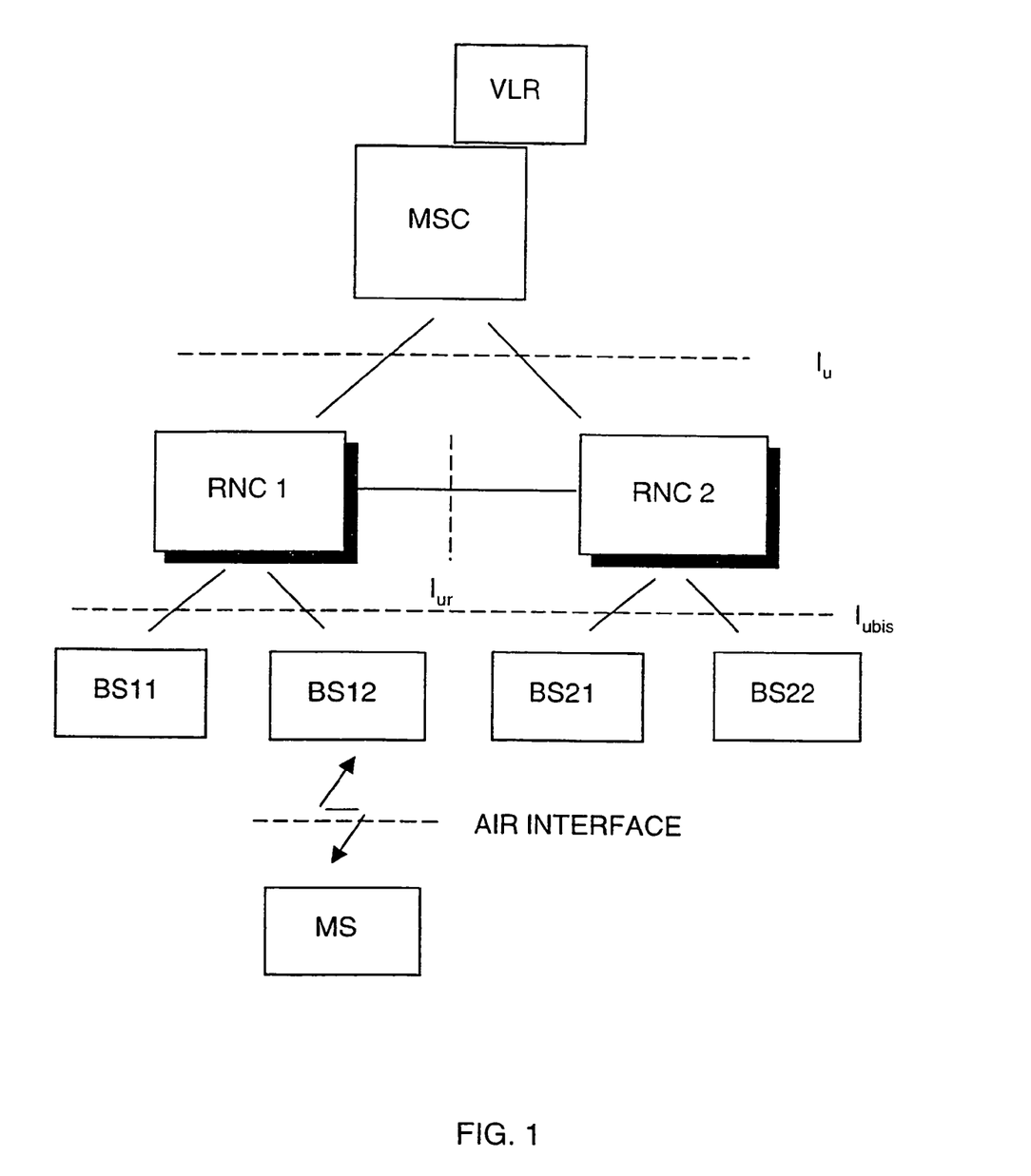
FIG. 1 shows a mobile telecommunication system.

The network elements and the internal relation between the network elements of a mobile telecommunication system are presented in FIG. 1. The network presented in the figure is in accordance with the UMTS system currently being standardized by ETSI (European Telecommunications Standards Institute). The network comprises base stations BTS (Base Transceiver Station), that can establish connections with the mobile stations MS, Radio Network Controllers RNC controlling the usage of base stations and Mobile Switching Centers MSC controlling the RNC's. In addition, the network comprises a Network Management System NMS, with the help of which the operator can modify the parameters of the other network elements. The interface between the MSC and the RNC's is generally called the Iu interface. The interface between the RNC's and the BTS's is the Iubis interface and the interface between the BTS and the MS's the radio interface. According to some proposals, an interface Iur between the RNC's is specified.

The calls of a mobile station are routed from the BTS via the RNC to the MSC. MSC switches the calls to other mobile switching centers or to the fixed network. The calls can as well be routed to another mobile station under the same MSC, or possibly even under the same BTS.

The radio interface between the base stations and the mobile stations may be divided into channels using a plurality of divisions. Known methods of division are, for example, Time Division Multiplexing TDM, Frequency Division Multiplexing FDM and Code Division Multiplex CDM. In TDM systems, the spectrum allocated for the system is divided into successive time frames consisting of time slots, each time slot defining one channel. In FDM the channel is defined by the frequency used in the connection. In CDM the channel is defined by the spreading code used in the connection. These methods can be used separately or be combined.

To be able to successfully communicate with the mobile telecommunications network, the mobile station continuously monitors the radio signals sent by the base stations. In the idle mode the mobiles decode the strongest signal received, and when needed request the establishment of a connection from the base station transmitting this signal.

During an active connection, the connection can be moved from one base station to another. The connection can be moved from one base station to another by simply rerouting the signal, which is called hard handover. The system interference can be decreased and thus the capacity increased especially in CDMA (Code Division Multiple Access) systems utilizing CDM by using soft handovers in which the mobile has simultaneously connections with a plurality of base stations, these base stations forming the so called active set of the connection.

The handover may be
- intra-cell handovers
- inter-cell handovers between two base stations under the same radio network controller
- inter-RNC handovers between two RNC's under the same MSC, or
- inter MSC handover between two cells under different MSC's.

In addition, the handover can be divided into intra-frequency handovers in which all the channels involved in the handover procedure are on the same frequency and inter-frequency handovers, in which there are channels from at least two frequencies involved in the handover procedure.

To be able to establish the handovers to right base stations during an active connection, the mobile station continuously measures the radio signals from the base stations it is in connection with as well as their neighboring base stations. The measurement results are transmitted to the network using the measurement reporting scheme specified in the system. Based on the reports, the network initiates the handover when the mobile station would have a better or at least sufficiently good radio connection to another base station.

In addition to the network initiated handovers, also mobile evaluated handovers are known. In an exemplary description of a mobile evaluated handover, the mobile station monitors the signal levels received from neighboring base stations and reports to the network those beacon signals which are above or below a given set of thresholds. Those thresholds can be dynamically adjusted as will be explained in the following. Based on this reporting scheme, the network will decide whether the active set of the connection is to be changed.

Two type of thresholds are used: the first one to report beacons with sufficient power to be used for coherent demodulation, and the second one to report beacons whose power has declined to a level where it is not beneficial to be used for receiving the sent information. Based on this information, the network orders the MS to add or remove base station signals from its active set.

While soft handover improves overall performance it may in some situations negatively impact system capacity and network resources. This is due to the unnecessary branches between the MS and the base stations in the active set. On the downlink direction from the base stations to the mobile station, excessive branch reduces system capacity while on the uplink direction from the mobile station to the base stations, it costs more network resources.

To solve this problem, the principle of dynamic thresholds for active set management is known in prior art. In this method, the MS detects beacons crossing a given static threshold T1. When crossing this threshold the beacon is moved to a candidate set. It is then searched more frequently and tested against a second dynamic threshold T2. This second threshold T2 will test if the beacon is worth adding to the active set.

When the beacons corresponding to the branches in the active set are weak, adding an additional branch signal, even a poor one, will improve performance. In these situations, a relatively low value of T2 is used. When there is one or more dominant beacons, adding an additional weaker branch whose beacon signal is above T1 will not improve performance but will utilize more network resources. In these situations a higher value of T2 is used.

After detecting a base station signal above T2, the MS will report it back to the network. The network will then set up the handover resources and order the MS to coherently demodulate the signal of this additional branch.

Beacons can be dropped from the active set according to the same principles. When the beacon strength decreases below a dynamic threshold T3, the handover connection is removed, and the beacon is moved back to the candidate set. The threshold T3 is a function of the total energy of beacons in the active set. When beacons in the active set are weak, removal a branch, even a weak one, will decrease performance. In these situations, a relatively low value of T3 is used. When there is one or more dominant branches, removal of a weaker signal will not decrease performance but will make the utilization of the network resources more efficient. In these situations a higher value of T3 is used. Branches not contributing sufficiently to the total received energy will be dropped. When further decreasing below a static threshold T4 a beacon is removed from the candidate set.

To be able to control the connection, the network needs in different situations different kinds and different amount of measurement information. The more information is sent the more efficient the handover algorithm are. However, the more information the mobile station sends the network, the more radio resources are spent. Thus, the measurement reporting schemes according to prior art are always compromises between the efficiency of the handover algorithms and the usage of radio resources.

As the usage of mobile telecommunication systems and multimedia applications requiring large bandwidths is growing the present methods are no longer sufficient, thus limiting the performance of the mobile telecommunication networks. The objective of the present invention is a flexible measurement reporting scheme which solves this problem.

SUMMARY OF THE INVENTION

The basic idea of the present invention is to specify at least two different triggers for sending a measurement report from the mobile station to the network. According to the invention, the network specifies the triggers to be used for different measurement report types. The triggers are preferably upper or lower threshold values for parameters of the radio signal, timer conditions, etc. In response to having detected that the measured value has exceeded its upper threshold value or gone under its lower threshold, the mobile station sends the network a measurement report.

According to a preferred embodiment, one or a plurality of the triggers can be inactivated by the network. However, at least one trigger must always be active.

According to one preferred embodiment, the triggers, i.e. the threshold values are defined separately for downlink and uplink directions. In addition, it is specified how the outputs of these triggers are to be combined. For example, it may be determined whether the measurement report is to be sent when both the uplink and downlink conditions are met, when either of them is met, based entirely on the downlink condition or based entirely on the uplink condition.

In one preferred embodiment, one of the measurement report types is mobile evaluated handover measurement report. Such a report is triggered in the mobile station when at least one upper threshold for the radio signal parameter for a mobile evaluated handover is exceeded or lower threshold gone under.

According to another preferred embodiment, one of the measurement report types is periodic handover measurement report. Such a report is triggered periodically with a period set by the network.

According to yet another embodiment, one of the measurement report types is a condition change based measurement report. In this report type, the transmission of the measurement report is triggered by a change in the radio signal parameter exceeding a threshold given by the network.

BRIEF DESCRIPTION OF THE FIGURES

The invention is described more closely with reference to the accompanying schematic drawings, in which.

DETAILED DESCRIPTION OF THE INVENTION

Figure 2:
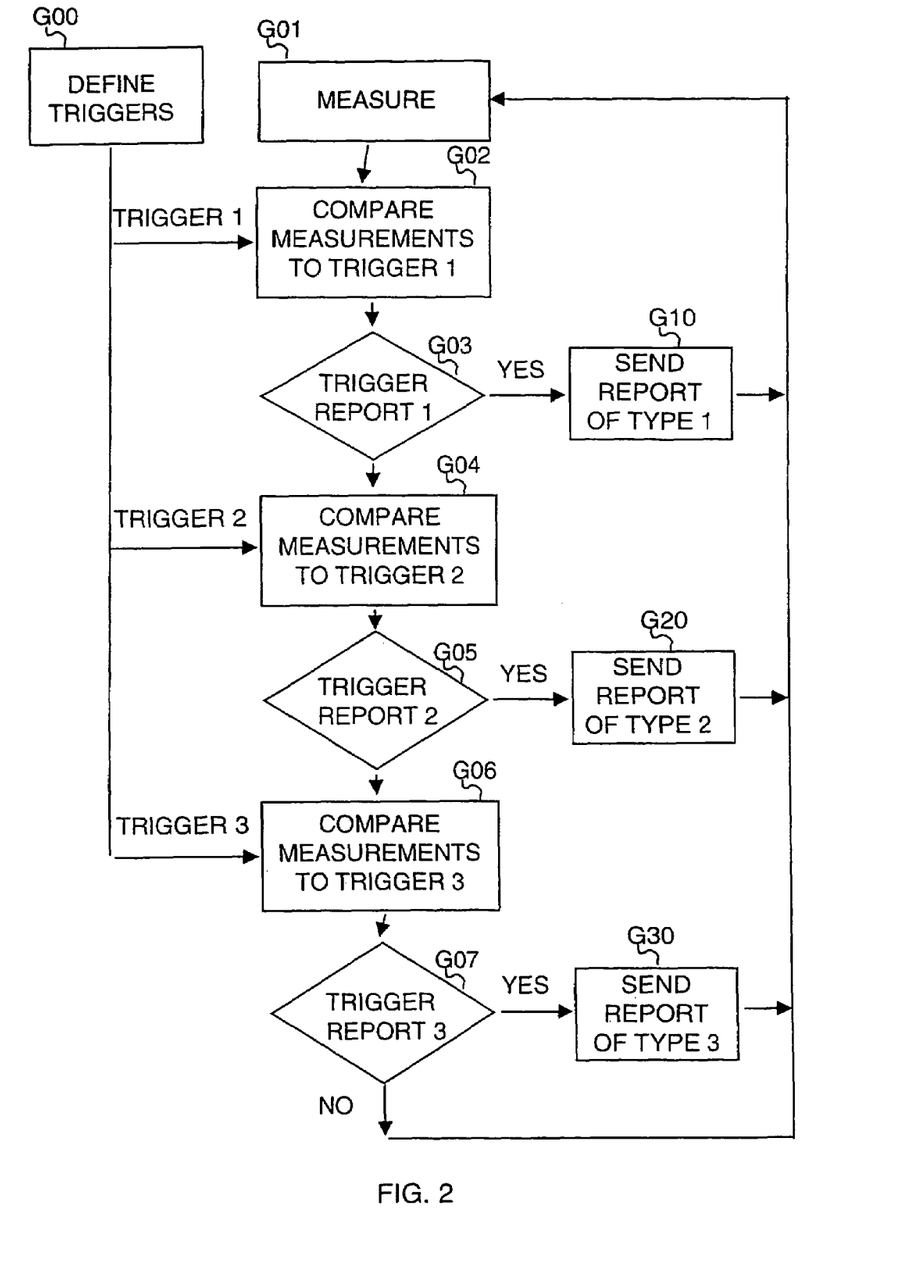
FIG. 2 shows a measurement reporting scheme.

The basic idea of the invention is presented schematically in FIG. 2. In stage G00, a plurality of triggers is defined in the network. In the exemplary embodiment presented in the figure, three triggers, TRIGGER 1, TRIGGER 2 and TRIGGER 3 are defined. However, is must be noted here that the invention is not limited to the use of exactly three triggers, but the number of triggers may be any number equal to or larger than two. The mobile station is informed about these triggers.

The mobile station continuously measures the radio signals from the base stations in the neighborhood (stage G01). In these measurements, the mobile acquires information necessary to compare the measurement results to the triggers.

At stage G02 the measurement results are compared to TRIGGER 1. If the conditions launching the trigger are met (decision stage G03), a measurement report of type 1 is sent to the network at stage G10, and the procedure continues to stage G01. If the conditions are not met, the procedure continues to stage G04.

At stage G04 the measurement results are compared to TRIGGER 2. If the conditions launching the trigger are met (decision stage G04), a measurement report of type 2 is sent to the network at stage G20, and the procedure continues to stage G01. If the conditions are not met, the procedure continues to stage G06.

At stage G06 the measurement results are compared to TRIGGER 3. If the conditions launching the trigger are met (decision stage G07), a measurement report of type 3 is sent to the network at stage G30. The procedure then continues to stage G01.

According to a preferred embodiment, one or a plurality of the triggers can be inactivated by the network. Thus, the network is capable of flexibly adjusting the reporting scheme. For example, when in the inner parts of a cell, the mobile station has a very good link with the base station. In such a situation, it is adequate that the mobile station informs the network, when the link gets worse than a given threshold. In this situation, only one of the trigger conditions is active. When the mobile station reaches the border region of the cell, this threshold condition is met, and the mobile station sends the network a measurement report. Upon receiving this report, the network decides, that the mobile station should be followed more closely, and orders the mobile station to start sending the measurement reports periodically and at once when the links monitor meet a second threshold condition. Now, two trigger conditions are active. In all situations, however, at least one trigger condition must be active.

In FIG. 2, the comparisons at stages G02, G04 and G06 are shown to be serial. However, they may as well be implemented as parallel processes.

In the following, three preferred types of measurement reports are specified more closely. The types are particularly preferred when using a Wideband CDMA (WCDMA) system utilising soft handovers. The report types are Mobile Evaluated HandOver (MEHO), periodic measurement reporting and condition change based measurement reporting.

The Mobile Evaluated Handover

In this context mobile evaluated handover means, that a handover measurement algorithm situated in the mobile triggers the handover report. The actual HO decision is always performed by the network. The handover report types can be further divided into intra-frequency and inter-frequency handover report types.

The Intra-Frequency Handover

The algorithm presented in the following includes the possibility to use information about the downlink (DL), uplink (UL) or both as the trigger for the HO report. Also this scheme provides a flexible means to control the information content of the HO report. The actual thresholds and timers in the algorithm are selected to be such, that a wide variety of HO algorithms can be constructed by the appropriate setting of these.

The mobile station continuously performs measurements on the radio signals from different BTS's according to the procedure described in the following.

The mobile measures the received power of the beacon channel for BTSi. This power is denoted as Prx,i (mW). The MS performs this measurement for time period t (a parameter preferably set by the network). The value of $P_{rx,i}$ is averaged over the measurement period. The result of this operation is denoted as $P\_ave_{rx,i}$. When the measurement is completed, the path loss estimate, denoted as Li (dB), is calculated as:

$$L_i = -10\log_{10}\left(\frac{P\_ave_{rx,i}}{P\_beacon_{tx,i}}\right). \quad (1)$$

In (1), the unit of $P\_beacon_{tx,i}$ is mW.

During the same measurement period t the MS also estimates the interference power of the beacon channel before or after (this is preferably a parameter defined by the network) correlating the received sum signal with the spreading code. The values calculated before or after the correlation differ due to the fact that the correlation remarkably reduces the interference caused by other connections. This interference is denoted as $l_i$ (mW). The interference is also averaged over the measurement period. After the averaging has been performed, the average value is converted into dBm. This average is denoted as $l\_ave_i$.

The MS is also to receive, e.g. on the beacon channel the DL_offset value of $BTS_i$, denoted as $DL\_offset_i$ (dB), which is a relatively stable parameter and there is thus no need to re-receive it for each measurement period. The purpose of this base station specific parameter is to specify for different cell sizes. The mobiles are handed over from a first set of cells more willingly than from a second set of cells. These cells of the first set thus become smaller than the cells of the other set. The offset value can be seen as an additional base station specific part of the threshold values that are soon to be presented more closely.

From the above information the MS is to calculate one DL HO measurement $S_{dl,i}$ sample as $$S_{dl,i}=L_i+I_{ave,i}+DL\_offset_i \quad (2)$$

$S_{dl,i}$ is thus a measure of the interference for the carrier to interference ratio CIR of the measured signal such that the larger the value of $S_{dl,i}$, the worse the link from the base station to the mobile station is. The scope of this invention is not limited to the use of this particular measure, but other measures of the link quality may as well be used when implementing the present invention. As one example, the bit error ratio BER in the received radio signal can be used as the measure.

The MS is also to receive, e.g. on the beacon channel, the total interference power, $l_{ul,i}$ (dBm) at the $BTS_i$ and the UL offset value, $UL\_offset_i$ (dB) of $BTS_i$. The MS is then to calculate the value of one UL HO measurement sample as $$S_{ul,i}=L_i+I_{ul,i}+UL\_offset_i \quad (3)$$

When these measurements and calculations have been performed for $BTS_i$ the MS is then to place the results as the first elements in the vectors $L\_vect_i$ (for the value of $L_i$), $S\_vect_{dl,i}$ (for the value of $S_{dl,i}$) and $S\_vect_{ul,i}$ (for the value of $S_{ul,i}$). The last element of these vectors is discarded. The vectors comprise the history of the measurement results. The length of the history maintained, defined by the length n of these vectors is a network parameter.

Having performed the measurements for this base station signal the MS checks whether a MEHO report is to be transmitted according to the HO algorithm described in the following chapter. The argument of the algorithm may be for instance either median or mean of the vectors $S\_vect_{dl,i}$ and $S\_vect_{ul,i}$, and is preferable defined by the network. In addition, the MS starts to measure the beacon signal transmitted by the next BTS $BTS_{i+1}$.

The HO algorithm is used to trigger the transmission of the MEHO measurement report. In the algorithm the UL and DL directions of transmission are treated separately. So actually two algorithms can function in the MS independently. The network can command the MS to use either one of them or both for the triggering of measurement report transmission. It should be noted, however, that the active set is always the same for both directions of transfer.

The algorithm includes the below thresholds:

1. Branch addition threshold denoted in this document as $BA\_abs_{th}$ and $BA\_rel_{th}$,
2. Branch deletion threshold denoted in this document as $BD\_abs_{th}$ and $BD\_rel_{th}$, and
3. Branch replacement threshold denoted in this document as $BR\_rel_{th}$ For the thresholds 1 and 2, both an absolute and a relative threshold are defined. Separate values can be defined for the uplink and the downlink directions. The thresholds are used in Branch Addition (BA), the Branch Deletion (BD) and the Branch Replacement (BR) decision units. These units may be implemented as hardware units, software blocks or a combination of these.

Figure 3:
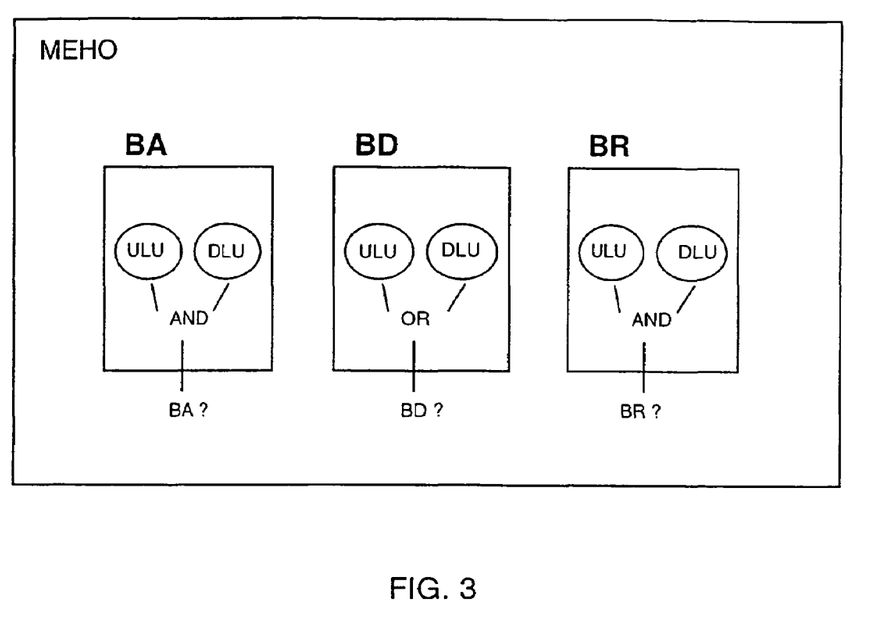
FIG. 3 shows the structure of a MEHO algorithm.

The basic structure of these algorithms is presented in FIG. 3. The uplink comparison unit ULU compares the measurement results of the uplink radio signals to triggers defined by the thresholds set to these signals, and outputs a logical truth value. The downlink comparison unit DLU compares the measurement results of the downlink radio signals to triggers defined by the thresholds set to these signals, and outputs a logical truth value. The results of ULU and DLU are combined to one logical signal using a logical function. The logical value may be, for example, AND or OR function, or a function outputting directly one of the input values of the block. The truth value of this signal is verified, and a report is sent if the truth value is TRUE, for example. Of course, using a different logical function when combining the outputs of ULU and DLU, it can be defined that the report is sent if the truth value is FALSE.

The parallel decision units BA, BD and BR shown in FIG. 3 are used in different situations. BA is used when the base station is not in the active set of the connection, and the number of links between the MS and BTS's in the active set is less than a given limit $N_{AS,max}$. The value of $N_{AS,max}$ is a preferably a parameter set by the network.

BD is used when the base station is in the active set of the connection. To prevent ping-pong effect, the logical functions of the BA and BD blocks must be consistent so that the same measurement values for a link between the MS and a BTS may not cause both the units to trigger a measurement report suggesting an addition or deletion of the same link. For example, if logical functions AND and OR are used, the value OR may not be used in both the decision blocks.

BR is used when the base station is not in the active set of the connection and the number of links between the MS and BTS's in the active set is equal to the limit $N_{AS,max}$. This decision unit is used to replace on link of the active set by another one having better radio characteristics.

Figure 4:
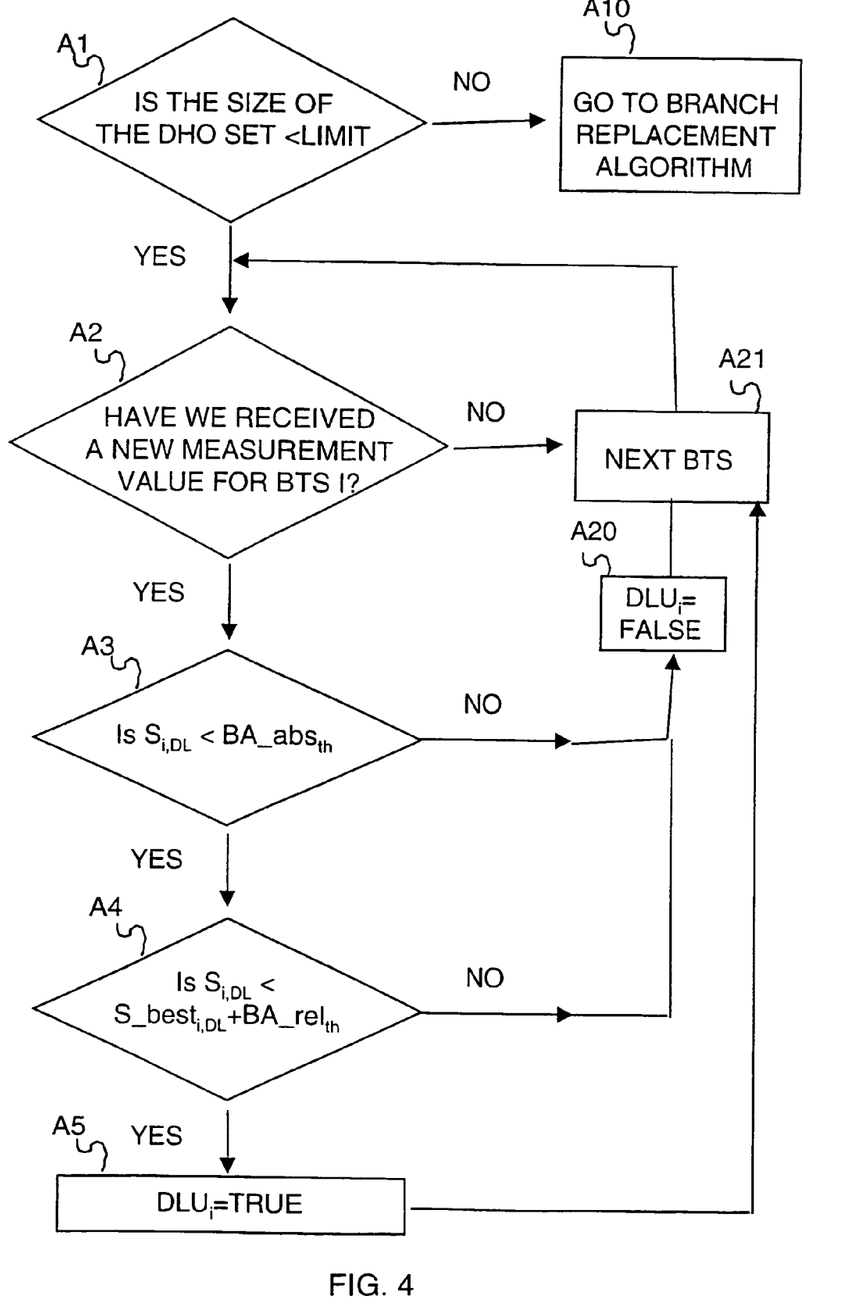
FIGS. 4, 5, 6,7 and 8 each show a decision flow chart.

One algorithmic implementation of the downlink comparison unit DLU of the branch addition algorithm BA is shown in FIG. 4. The algorithm is used for beacon signals from base stations that do not belong to the active set. At stage A1 it is checked whether the number of base stations in the active set is less than a predefined limit, i.e. whether the active set is full. As an example, the limit 3 can be used here. If the active set is full, the branch replacement algorithm is selected instead of this algorithm (stage A10).

If the active set is not full the procedure proceeds to stage A2, A3 and A4, in which it is checked whether new measurement results have been received (stage A2), $S_{i,DL}$ is compared to absolute threshold $BA\_abs_{th,DL}$, and $S_{i,DL}$ is compared to threshold $S\_best_{i,DL}+BA\_rel_{th,DL}$, in which $S\_best_{i,DL}$ is the value measured for the best active branch.

If new results have been received and both the threshold values $BA\_abs_{th,DL}$ and $S\_best_{i,DL}+BA\_rel_{th,DL}$ are higher than $S_{i,DL}$, the output of the DLU is set to TRUE.

The uplink branch can be implemented using a similar algorithm. If new results for the uplink have been received and both the threshold values $BA\_abs_{th,UL}$ and $S\_best_{i,UL}-BA\_rel_{th,UL}$ are higher than $S_{i,UL}$, the output of the ULU is set to TRUE. The threshold values $BA\_abs_{th,DL}/BA\_abs_{th,UL}$ and $BA\_rel_{th,DL}/BA\_rel_{th,UL}$ used in different directions may be different from each other or identical.

The values of the DLU and ULU algorithms are inputted into the logical function, as shown in FIG. 3. MEHO measurement report is sent if the function outputs a value TRUE. For example, if the logical value used is AND, the MEHO measurement report is sent when both the ULU and DLU have value TRUE.

Figure 5:
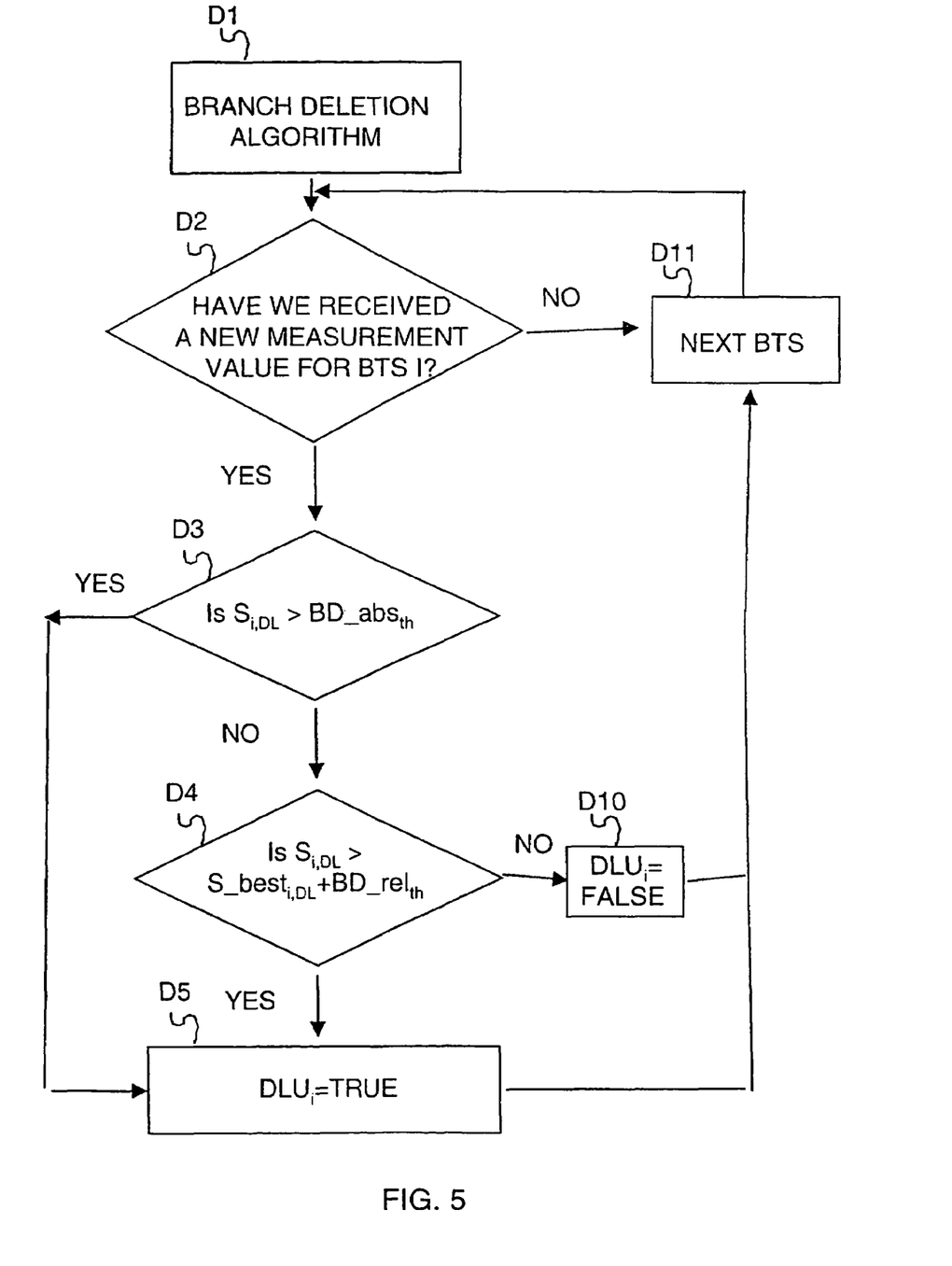

An algorithmic implementation of the downlink comparison unit DLU of the branch deletion algorithm BD is shown in FIG. 5. This algorithm is used for beacon signals from base stations that belong to the active set.

It is first checked whether new measurement results have been received (stage D2). The measurement result $S_{i,DL}$ is compared to thresholds $BD\_abs_{th,UL}$ (stage D3) and $S\_best_{i,DL}+BD\_rel_{th,UL}$ (stage D4). If either of these thresholds is lower than $S_{i,DL}$, the DLU is set to TRUE (stage D5). Otherwise, DLU is set to FALSE (stage D10) and the next beacon signal in the active set is measured.

A similar comparison in made between the uplink measurement results and uplink thresholds to define the value of ULU. DLU and ULU are combined using a logical function defined by the network to make a decision whether to send or not to send a MEHO measurement report. To prevent the ping-pong effect, the logical function used is selected so that the same measurement results never cause the BA to request the addition of a branch and the BD to delete the same branch. To meet this requirement, only one of the logical functions used in BA and BD algorithms according to the same reporting option may be a logical OR function.

Figure 6:
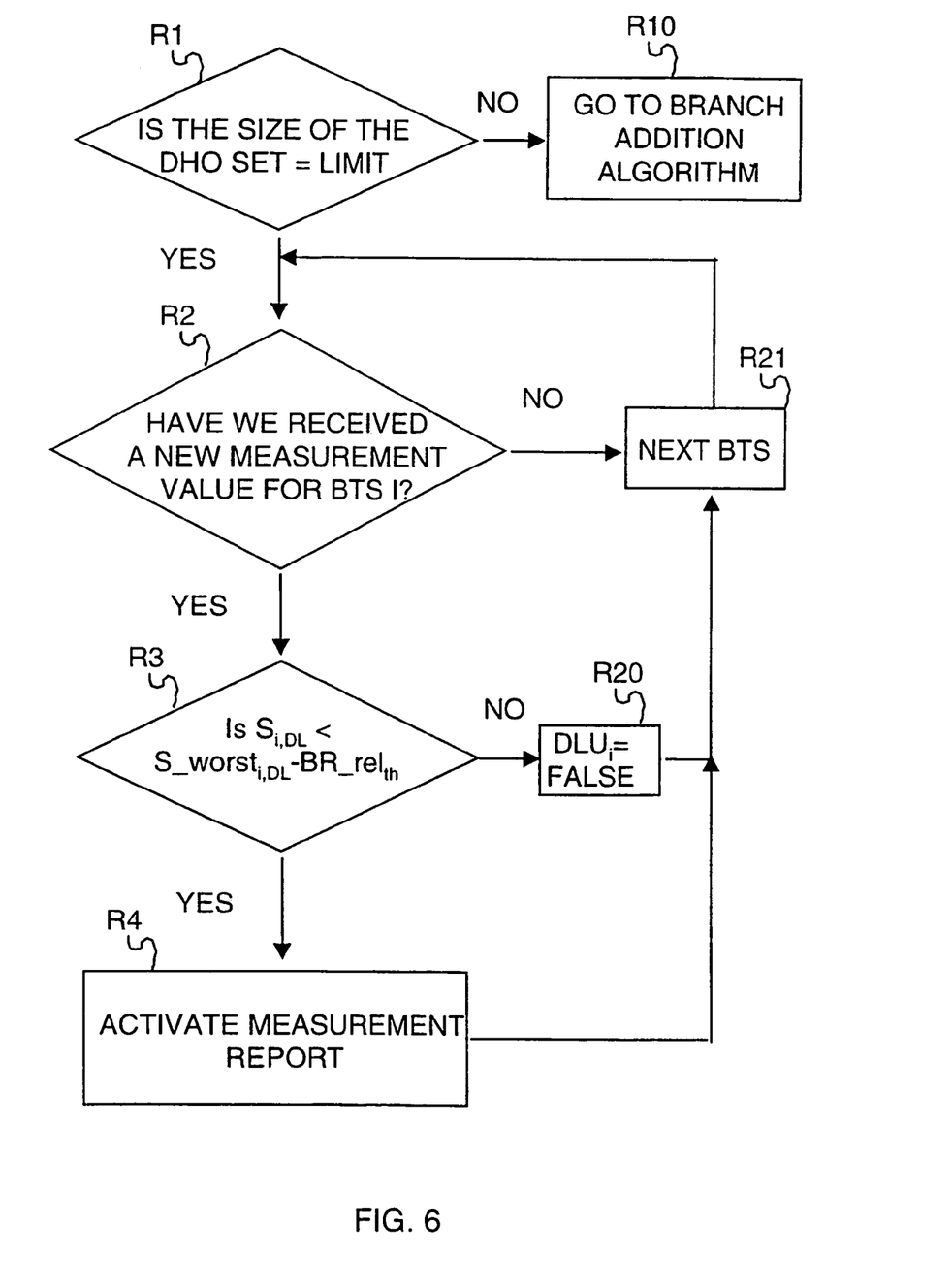

An algorithmic implementation of the downlink comparison unit DLU of the branch replacement algorithm BR is shown in FIG. 6. The algorithm is used for beacon signals from base stations that do not belong to the active set. At stage R1 it is checked whether the number of base stations in the active set is equal a predefined limit, i.e. whether the active set is full. As an example, the limit 3 can be used here. If the active set is not full, the branch addition algorithm is selected instead of this algorithm (stage R10).

If the active set is full the procedure proceeds to stage in which it is checked whether new measurement results have been received (stage R2). If no new measurement results have been received, the next beacon signal is studied. If new measurement result $S_{i,DL}$ has been received it is compared at stage R3 to the measurement value $S\_worst_{i,DL}$ of the worst link in the active set. If $S\_worst_{i,DL}$ exceeds $S_{i,DL}$ with a margin of $BR\_rel_{th}$ DLU is set to TRUE (stage R4). Otherwise ULU is set to FALSE (stage R20) and the measurements on a next BTS not belonging to the active set studied.

The uplink branch can be implemented using a similar algorithm. In this comparison, $S_{i,UL}$ is compared to $S\_worst_{i,DL}$ of the worst link in the active set. If $S_{i,DL}$ exceeds $S\_worst_{i,DL}$ with a margin of $BR\_rel_{th}$ DLU is set to TRUE. The margin values $BR\_rel_{th}$ are preferably identical in downlink and uplink directions, but also different values in different directions can be used. This is a parameter that is defined by the network. DLU and ULU are combined using a logical function to make a decision whether to send or not to send an MEHO measurement report. The logical function is preferably a logical AND function. In another preferred embodiment, the logical function can be adjusted freely by the network. The output of the logical function can be, e.g. the truth value of DLU or ULU.

When the MEHO algorithms in the mobile station trigger the measurement report the status of the M best cells/sectors is transmitted. The transmitted measurement report is always to include the appropriate values for the active set. The M best cells/sectors are determined by using the values of $S_{i,dl}$ or $S_{i,ul}$ depending on whether it was DL or UL algorithm that triggered the report. The contents of the report is preferably determined with an message sent from the network. The measurement report includes, for example the following values for each cell/sector to be reported. These values are the filtered values.

1. $S_{i,dl}$
2. $S_{i,ul}$
3. $L_i$

It should be noted, that the measurement report can include information only about neighbour BTSs whose beacon signals have been decoded. Thus the handover report has to include the information of the number of BTSs that are being reported.

The information included in the measurement report may preferably be defined by the network. For example, the number of beacon signals whose power level is to be reported in a measurement report is preferably defined by the network.

The Inter-frequency HO

The inter-frequency measurements are always initiated by the network. Thus the mobile can perform inter-frequency MEHO only after the network has first commanded the MS to start the inter-frequency HO measurements.

There are at least three different reasons for inter-frequency HO:

1. Coverage. The MS is e.g. exiting the coverage area of a microcell and has to hand over to a macrocell. This case may be relatively simple. For example if the branch deletion has triggered a measurement report and only one branch is active the conclusion by the network is, that the MS is exiting the coverage area. The network responds to this by transmitting a message 'start i-f measurements'. This message includes the possible candidate BTSs. The mobile would then start searching for a stronger BTS on the other frequency. The transmission of the measurement report is triggered when the MS finds a candidate BTS on the other (new) frequency that is stronger than the best active branch on the current frequency.

2. Load. If for some reason the load on the used frequency is higher than on some other available frequency an inter-frequency HO may be appropriate. This situation would probably be known only by the network. After the network has detected the overload situation the actions are the same as in case 1

3. Mobile speed. The speed of the MS is so high, that an excessive amount of handovers are needed if the MS is connected to the microcell layer. This is an item for further study. The most crucial question is the detection of the MS speed. That is, there a method to reliably estimate the MS speed? Can the received beacon powers be measured often enough to be able to use fast fading based methods? What signalling does the MS use to indicate its' speed if the estimation is in the mobile?

After the MS has been commanded by the network to start the inter-frequency measurements the MS is to perform the measurements on the frequency given in the start measurement command.

The algorithm is used to trigger the transmission of the inter-frequency measurement report. In the algorithm the UL and DL directions of transmission are treated separately. So, actually two decision algorithms, DLU and ULU function in the MS independently. The outputs of these algorithms are combined as shown in FIG. 3 to make the final decision concerning sending the measurement report. The network can command the MS to use either one of them or both for the triggering of measurement report transmission. It should however be noted, that the active set is always the same for both directions of transfer.

Figure 7:
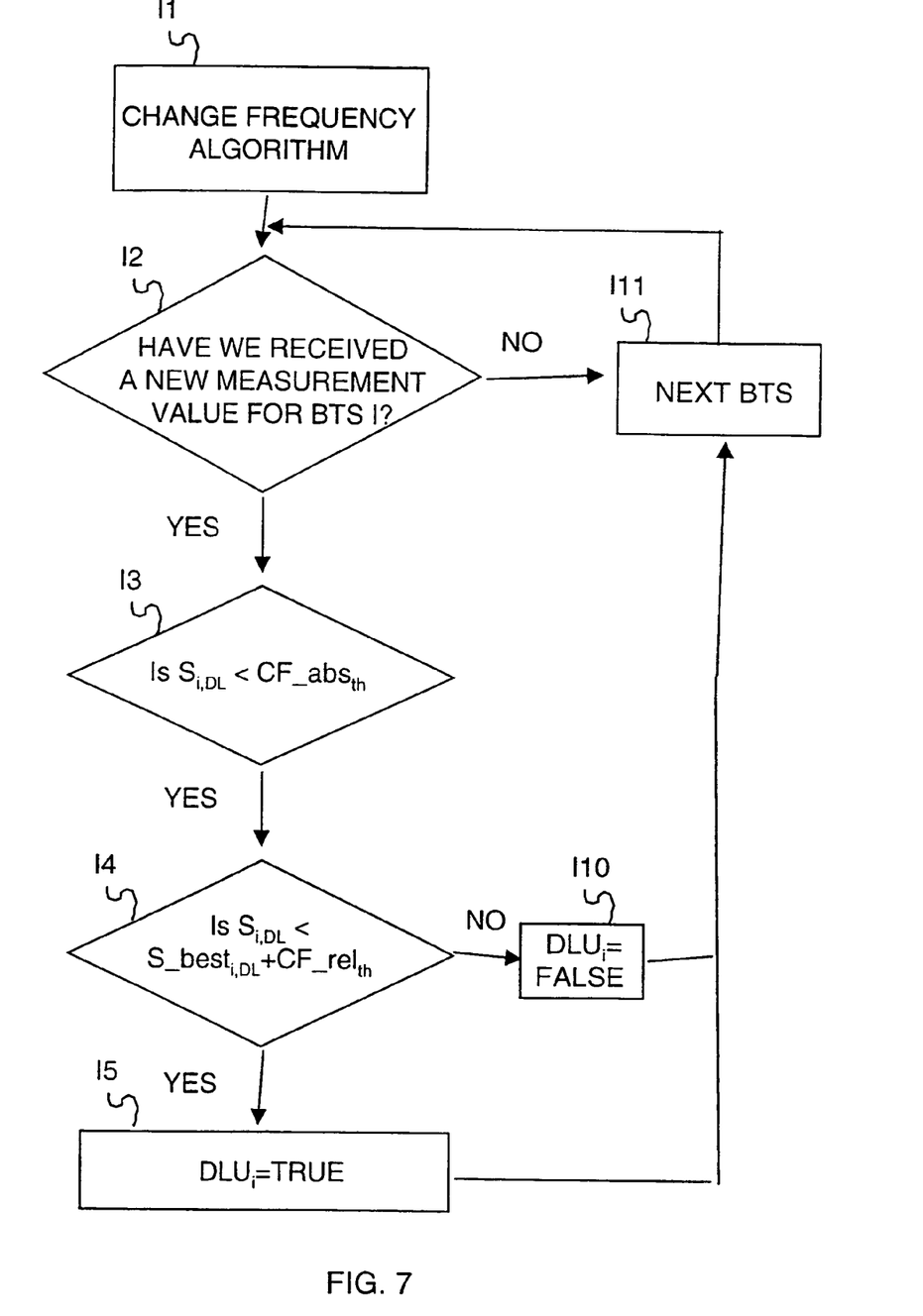

The algorithm includes the below threshold. For the threshold an absolute and a relative threshold $CF\_abs_{th}$ and $CF\_rel_{th}$ are defined. The decision flow chart for DLU unit of the algorithm is shown in FIG. 7.

If new measurement results have been acquired in the new frequency not belonging to the active set, the link losses the beacon signal is suffering are compared to an absolute threshold $CF\_abs_{th}$. If the quality of the link is sufficient it is compared to the best link in the active set. If the quality is better with a predetermined margin the output of the DLU algorithm is set to TRUE.

A similar algorithm ULU is run for downlink direction. The outputs of DLU and ULU are combined using a logical function as described earlier.

When the HO algorithms trigger the inter-frequency measurement report the status of the M best cells/sectors is transmitted. The M best cells/sectors are determined by using the values of $S_{i,dl}$ or $S_{i,ul}$ depending on whether it was DL or UL algorithm that triggered the report. The contents of the report is determined with a message sent from the network. The measurement report includes, e.g. the following values for each cell/sector to be reported. These values are the filtered values.

1. $S_{i,dl}$
2. $S_{i,ul}$
3. $L_i$

It must be noted that the possible logical functions are not limited to those presented in the examples above. For instance, if the outputs of the DLU and ULU functions are not binary but have more levels or are even continuous functions triggered by some events on the radio signals in respective directions, fuzzy logical functions can be used when making the decision whether to send or not to send a measurement report based on the outputs of the functions DLU and ULU. The fuzzy logical functions are preferably given by the network.

Periodic Handover Reporting

In a periodic measurement scheme the MS continuously performs measurements on the radio signals. The measurement report is to be transmitted periodically by the MS to the network. The transmission period is defined by the parameter T_report set by the network. It shall include the M best cells/sectors. The transmitted measurement report is always to include also the appropriate values for the active set. Whether the order of the sectors is set by $S_{i,dl}$ or $S_{i,ul}$ is set by the network.

The measurement report includes, e.g. the following filtered values for each cell/sector to be reported. These values are the filtered values.

1. $S_{i,dl}$
2. $S_{i,ul}$
3. $L_i$

It should be noted that the measurement report can include information only about neighbour BTSs whose beacon signals have been decoded. Thus the handover report has to include the information of the number of BTSs that are being reported. The parameters-defined by the network are preferably similar to those defined in the MEHO case presented above.

Condition Change Based HO Reporting Scheme

The transmission of a condition change based measurement report is triggered if the conditions change by a sufficient amount. The amount of change needed is set by the network and denoted as Change$_{th}$ (dB).

In this reporting scheme, the MS keeps a list of the N (a parameter preferably defined by the network) best BTSs. The order is determined by using either S$_{i,ul}$ or S$_{i,dl}$(preferably an option set by network). When the value of S$_{i,ul}$ or S$_{i,dl}$ for one of these BTSs changes by Change$_{th}$ a measurement report for including the new values of the changed quantities is transmitted. A measurement report is also transmitted if a new BTS appears, that is better than Replace$_{th}$ (dB) compared to the worst BTS (the value of S$_{i,ul}$ or S$_{i,dl}$ is used for this comparison depending on how the BTSs are placed in order) in the list. A measurement report can be at most transmitted every T ms (this is a network parameter).

This method requires, that the MS keeps in memory in a table the values of the parameters transmitted in the previous measurement reports. That is, the MS has to keep in memory the situation as the network sees it based on the measurement reports transmitted by the MS. This table must include as its' elements the values of the quantities required (by the network) to be reported and the set of reported base stations, i.e. those base stations whose beacon signal measurements are reported. The format of this table, i.e. the HO_table is thus for example the following:

|  | S$_{i,dl}$ | S$_{i,ul}$ | L$_i$ | P_beacon$_{tx,i}$ |
|---|---|---|---|---|
| BTS$_1$ | | | | |
| ... | | | | |
| BTS$_n$ | | | | |

Figure 8:
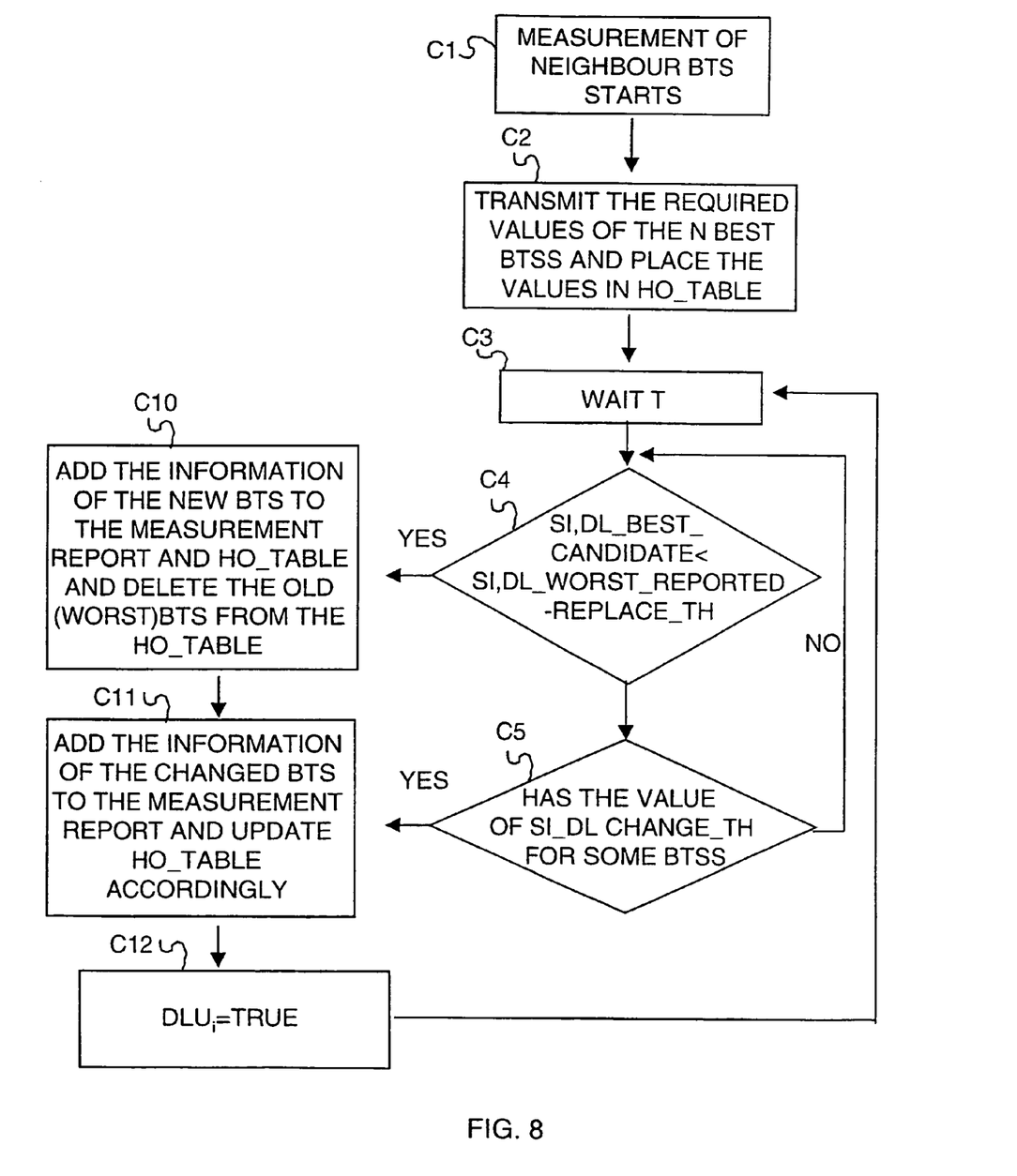

An implementation for the decision diagram for sending a condition change based measurement report is depicted in FIG. 8. Having measured the signals (stage C1) and sent a measurement report (stage C2), the procedure waits for a delay T defined by the network (stage C3). At stage C4 the best signal of those beacon signals that do not belong to the set of reported base stations, i.e. the candidate base stations, is compared to the worst signal of those beacon signals that belong to the set of reported base stations. If the signal quality of the candidate base station exceeds that of the worst reported base station by a margin replace-th defined by the network, the worst base station is replaced by the candidate base station in the set of reported base stations (stage C10). The HO-table is updated (stage C11) and a measurement report transmitted (stage C12).

If there is no need to update the list of reported base stations, the changes in the measured signal values are compared to the given thresholds at stage C5. If the thresholds are not exceeded, the procedure returns to stage C4. If at least one of the thresholds is exceeded, a measurement report is generated (stage C11) and transmitted (stage C12).

The contents of the measurement report may be the same as the elements in HO_table for the BTSs whose measurement value (S$_{i,ul}$ or S$_{i,dl}$) have changed. The measurement report/HO_table can include, for example, the following filtered values for each cell/sector to be reported:

1. S$_{i,dl}$
2. S$_{i,ul}$
3. L$_i$

The inter-frequency scheme for the condition change based reporting scheme is the same as the intra-frequency scheme except that the network commands the MS to initiate the measurements only when needed.

Figure 9:
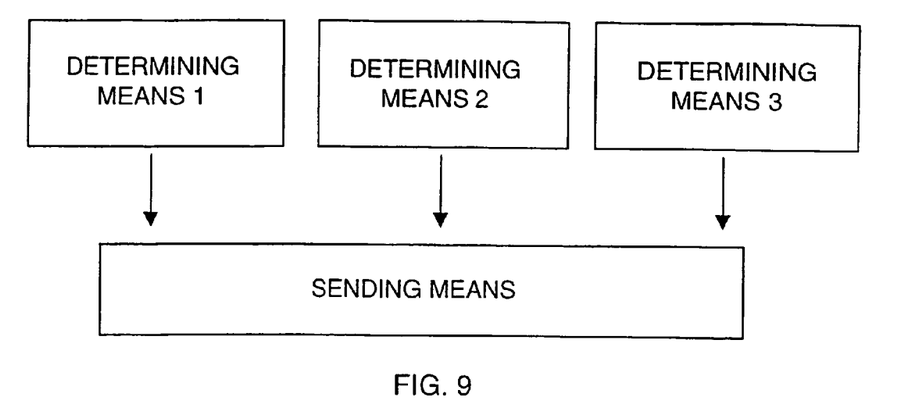
FIG. 9 shows functional entities in a telecommunication network.

A network functionality's according to the invention are shown in FIG. 9. The network comprises
  determining means for determining a plurality of independent trigger conditions sending means responsive to the determining means for sending the determined trigger conditions to a mobile station.

The sending means may send the threshold values to the corresponding mobile station using the Dedicated Control Channel DCCH associated with a traffic connection to the mobile station, for example. These means are preferably implemented in a single network element of the network, such as in the Radio Network Controller RNC.

In one preferred embodiment, one of the determining means determines thresholds for triggering the sending of a measurement report in the mobile station when at least one upper threshold for a mobile evaluated handover is exceeded or lower threshold gone under. An example of suitable parameters for such thresholds was given above.

In one preferred embodiment, one of the determining means determines trigger conditions for the transmission of a measurement report in the mobile station periodically. In this case, the determining means determine the suitable period for measurement reporting.

The determining means are preferably arranged to define the activity of respective trigger conditions, and the sending means are arranged to send this information to the mobile station.

According to yet another embodiment, one of the determining means determines thresholds for triggering the sending of a measurement report in the mobile station triggered by a change in the radio resources exceeding a threshold given by the network. An example of suitable parameters for such thresholds was given above.

Figure 10:
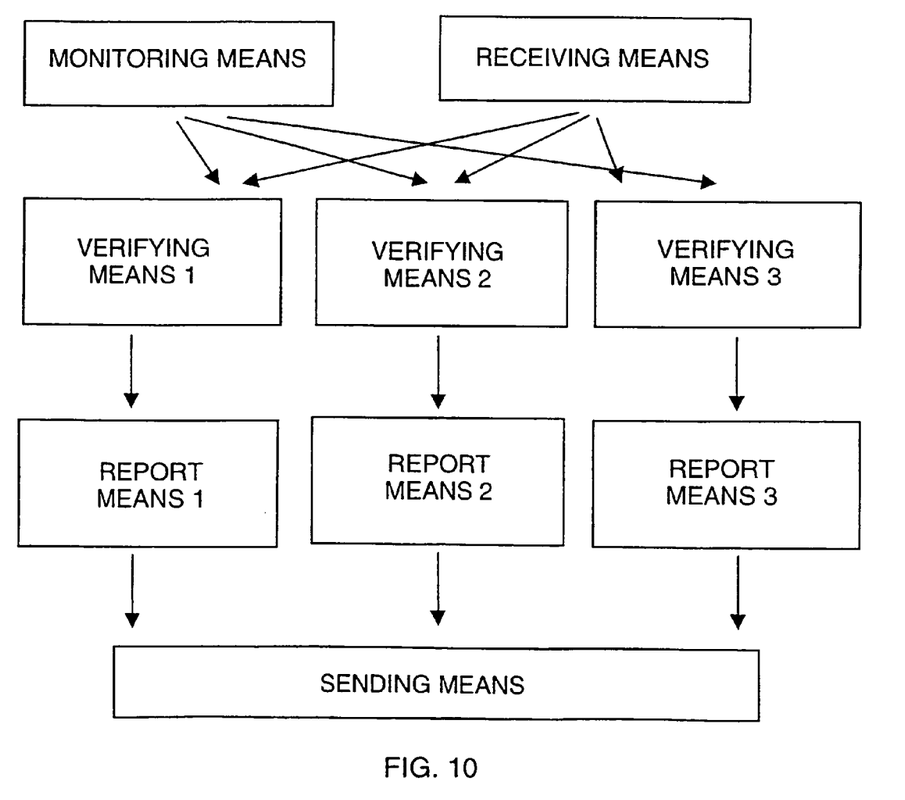
FIG. 10 shows functional entities in a mobile station.

A mobile station MS according to present invention is shown in FIG. 10. The mobile station comprises
  receiving means for receiving from the network trigger conditions for the transmission of a measurement report,
  monitoring means for monitoring the radio signals,
  a plurality of verifying means which is responsive to the receiving means and the monitoring means and which has the functionality of verifying whether the trigger conditions for sending a measurement report of a specified type are met,
  a plurality of report means responsive to the verifying means for establishing a measurement report, and
  sending means responsive to the report means for sending a measurement report to the network.

Preferably, the mobile station further has
  determining means (DLU, ULU) for verifying trigger conditions for uplink and downlink measurements separately to generate two different verification results and
  combining means responsive to the determining means for combining the verification results and to make the decision whether to send or not to send a measurement value, as shown in FIG. 3.

The measurement reporting scheme according the invention provides flexible means for reporting measurement results. The advantage of the flexibility is that the measurement reporting can be adjusted to provide the network the necessary information while minimizing the amount of radio resources spent for the measurement reporting purposes.

The invention has been described above by means of preferred embodiments to illustrate the principles of the invention. As regards the details, the invention may vary within the scope of the attached claims. For example, the trigger condition for sending a measurement report may be a threshold for a linear combination of the downlink and uplink measurement results. In this case, the function defining the linear combination is preferably defined by the network.

What is claimed is:

1. A method of measurement reporting in a telecommunication system comprising mobile stations and a network comprising base stations, wherein handover decisions on establishing or cancelling a link between a mobile station and a base station are made in the network on the basis of measurement reports sent from the mobile station to the network, the method comprising:

defining by the network a plurality of parameters for the mobile station, sending the parameters to the mobile station, determining by the mobile station a plurality of independent measurement report triggering conditions using the network defined parameters, monitoring at the mobile station properties of a plurality of radio signals received from respective base stations, verifying by the mobile station whether a measurement report triggering condition has been met, generating a measurement report comprising information about the monitored radio signals at the mobile station when one of the triggering conditions has been met, and transmitting the generated measurement report to the network.

2. A method of measurement reporting in a telecommunication system comprising mobile stations and a network comprising base stations, wherein handover decisions on establishing or cancelling a link between a mobile station and a base station are made in the network on the basis of measurement reports sent from the mobile station to the network, the method comprising:

sending by the network a plurality of independent measurement report triggering conditions for the mobile station, monitoring at the mobile station properties of a plurality of radio signals received from respective base stations, responsive to both the monitored radio signals and the triggering conditions, generating a measurement report comprising information about the monitored radio signals at the mobile station, and transmitting the generated measurement report to the network.

3. A method according to claim 1, wherein the method further comprises a step of resetting a timer in connection with the step of transmitting a measurement report, and one of the triggering conditions comprises a condition for the value of the timer.

4. A method according to claim 1, wherein one of the triggering conditions is a threshold for a radio signal parameter or a function thereof.

5. A method according to claim 4, wherein the radio signal parameter is the received power level of the signal or a function thereof.

6. A method according to claim 4, wherein in the radio signal parameter is the interference in the received radio signal or a function thereof.

7. A method according to claim 6, wherein the network uses CDMA air interface in which the connections are separated using different spreading codes, and the value for the interference is an estimate for the interference power.

8. A method according to claim 1, wherein the method further comprises:

defining by the network the activeness of the measurement report triggering conditions so that at least one triggering condition is active and the remaining triggering conditions if any are inactive, not performing the transmitting the generated measurement report in response to meeting an inactive triggering condition, and performing the transmitting the generated measurement report if one active triggering condition has been met.

9. A method according to claim 4, wherein the method further comprises:

the mobile station receiving corresponding base station specific offset values from the base stations it monitors; and using the base station specific offset values in the step of verifying by the mobile station whether a measurement report triggering condition has been met.

10. A method according to claim 9, wherein the offset value is dynamically defined by the network.

11. A method according to claim 4, wherein the one triggering condition comprises a threshold for the change of a radio parameter or a function thereof.

12. A method according to claim 4, wherein a first set of triggering conditions is defined for the radio signals in the uplink direction and a second set of triggering conditions is defined for the radio signals in the downlink direction, a logical function is defined for combining the first and the second set of triggering conditions, and at the mobile station, the state of each triggering condition is determined, the states combined using the logical function, and the measurement report is sent in dependence on the condition of the logical function.

13. A method according to claim 12, wherein the first and second set of triggering conditions are dynamically defined by the network.

14. A method according to claim 12, wherein the logical function is defined by the network.

15. A method according to claim 12, wherein a first combination of the first and second sets of triggering conditions and the logical functions are defined to be used for radio signals from or to active base stations having an active link with the mobile station, a second combination of the first and second sets of triggering conditions and the logical functions are defined to be used for radio signals from or to candidate base stations not having an active link with the mobile station, and at the mobile station, the first combination is used for radio signals from or to active base stations and the second combination is used for radio signals from or to candidate base stations.

16. A method according to claim 15, further comprising creating an active link between the mobile station and a candidate base station not having an active link with the mobile station when the network receives from the mobile station a measurement report triggered by that candidate base station.

17. A method according to claim 15, further comprising deleting an active link between the mobile station and a base station when the network receives from the mobile station a measurement report triggered by that active base station.

18. A method according to claim 15, wherein said two different logical functions are such that when a base station is in the active set, a measurement report is not triggered by a radio signal of that base station for the same set of radio properties as would trigger the transmission of a measurement report when the base station is in the candidate set.

19. A method according to claim 12, further comprising defining a logical function for use when the number of base stations in the active set is equal to a predefined maximum number, and defining the first and second sets of triggering conditions on the basis of the radio signal properties of the active base station having the worst signal conditions, and wherein a measurement report is triggered by a radio signal of a candidate base station causes that worst base station to be replaced by the candidate base station.

20. A method according to claim 19, wherein the maximum number is dynamically defined by the network.

21. A method according to claim 1, wherein the network informs the mobile station what information to include in the measurement report, and the mobile station includes this information in the measurement report.

22. A method according to claim 21, wherein the radio signals are ordered using a predefined condition, and in the measurement report sent from the mobile station, information about the properties of a predefined number of the best radio signals according to the condition are reported.

23. A method according to claim 21, wherein the number of radio signals to be reported is given by the network.

24. A method according to claim 21, wherein the measurement report comprises a value for the path loss for a reported signal or a function thereof.

25. A method according to claim 21, wherein the measurement report comprises a value for the carrier to interference ratio of a reported signal or a function thereof.

26. A telecommunication network for a telecommunication system comprising mobile stations and the network comprising base stations, in which system the mobile stations monitor radio signals sent by the base stations and handover decisions on establishing or cancelling a link between a mobile station and a base station are made in the network on the basis of measurement reports sent from the mobile station to the network, the network further comprising:
  a determining means for determining a plurality of parameters for a mobile station for use by the mobile station to determine a plurality of independent measurement report triggering conditions, and
  a sending means responsive to the determining means for sending the determined parameters to the mobile station.

27. A telecommunications network for a telecommunication system comprising mobile stations and the network comprising base stations, in which system the mobile stations monitor radio signals sent by the base stations and handover decisions on establishing or cancelling a link between a mobile station and a base station are made in the network on the basis of measurement reports sent from the mobile station to the network, wherein the network comprises:
  determining means for determining a plurality of independent measurement report triggering conditions for use by a mobile station together with monitored radio signals of a plurality of base stations to trigger the transmission of a measurement report from a mobile station, and
  sending means responsive to the determining means for sending the determined triggering conditions to the mobile station.

28. A network element for a telecommunication network for a telecommunication system comprising mobile stations and the network comprising base stations, in which system the mobile stations monitor the radio signals sent by base stations and handover decisions on establishing or cancelling a link between a mobile station and a base station are made in the network on the basis of measurement reports sent from the mobile station to the network, wherein the network element comprises:
  a determining means for determining a plurality of parameters for a mobile station for use by the mobile station to determine a plurality of independent measurement report triggering conditions, and
  sending means responsive to the determining means for sending the determined parameters to the mobile station.

29. A mobile station for a telecommunication system comprising mobile stations and a network comprising base stations, in which system handover decisions on establishing or cancelling a link between a mobile station and a base station are made in the network on the basis of measurement reports sent from the mobile station to the network, wherein the mobile station comprises:
  a receiving means configured to receive a plurality of parameters from the network,
  means for determining a plurality of independent measurement report triggering conditions using the received parameters,
  a monitoring means for monitoring properties of a plurality of radio signals received from respective base stations,
  a plurality of verifying means for verifying whether a measurement report triggering condition has been met,
  a plurality of report means responsive to the verifying means for establishing a measurement report comprising information about the monitored radio signals when one of the triggering conditions has been met, and
  a sending means for sending the measurement report to the network.

30. A mobile station according to claim 29, wherein the receiving means has been configured to receive at least a first and second different set of triggering conditions for uplink and downlink signals, and a logical function for combining these sets of triggers,
  the verifying means have been arranged to determine the states of each triggering condition and to combine the states according to the logical function, and
  the report means have been arranged to establish a measurement report to be sent by the sending means in dependence upon the condition of the logical function.

31. A method according to claim 1, wherein the measurement report is generated when any one of the triggering conditions has been met.

32. A telecommunications network according to claim 26, wherein the determining means has been further arranged to define the activeness of respective triggering conditions, and the sending means has been arranged to send information about the activity state to the mobile station.

33. A network element for a telecommunication network for a telecommunication system comprising mobile stations and a network comprising base stations, in which system the mobile stations monitor the radio signals sent by base stations and handover decisions on establishing or cancelling a link between a mobile station and a base station are made in the network on the basis of measurement reports sent from the mobile station to the network, wherein the network element comprises:
  determining means for determining a plurality of independent measurement report triggering conditions for a mobile station the triggering conditions being determined to be used together with monitored properties of radio signals corresponding to different base stations, and sending means responsive to the determining means for sending the determined trigger conditions to the mobile station.

34. A mobile station for a telecommunication system comprising mobile stations and a network comprising base stations, in which system decisions on establishing or cancelling a link between a mobile station and a base station are made in the network on the basis of measurement reports sent from the mobile station to the network, wherein the mobile station comprises:

receiving means configured to receive from the network a plurality of independent measurement report triggering conditions and to receive radio signals from a plurality of base stations, monitoring means for monitoring the radio signals received from respective base stations, a plurality of verifying means responsive to the receiving means and to the monitoring means and which have the functionality of verifying whether one of the measurement report triggering conditions has been met, a plurality of report means for establishing a measurement report comprising information about the monitored radio signals, and sending means for sending the measurement report to the network.

35. A mobile station according to claim 29, wherein the receiving means receives from the network information indicating at least one triggering condition as active, the remaining report triggering conditions being inactive, and the sending means transmits the generated measurement report if at least one active triggering condition has been met.

36. A mobile station according to claim 29, wherein the receiving means has been configured to receive base station specific offset values, and the verifying means have been arranged to use the base station specific offset values in verifying whether a triggering condition has been met.

37. A mobile station for a telecommunication system that includes mobile stations and a network comprising base stations, in which system decisions on establishing or cancelling a link between a mobile station and a base station are made in the network on the basis of measurement reports sent from the mobile station to the network, wherein the mobile station has receiving means for receiving parameters from the network for triggering the transmission of a measurement report and for receiving radio signals from a plurality of base stations, monitoring means for monitoring properties of a plurality of radio signals received from respective base stations, verifying means for calculating link quality measures for the base stations with an equation using the monitored properties of the radio signals and the received parameters, and the verifying means being configured to determine using the calculated link quality measures whether a trigger condition for sending a measurement report is met.

* * * * *